(12) United States Patent  
Franchet et al.

(10) Patent No.: US 8,782,887 B2  
(45) Date of Patent: Jul. 22, 2014

(54) METHOD FOR PRODUCING A METAL INSERT TO PROTECT A LEADING EDGE MADE OF A COMPOSITE MATERIAL

(75) Inventors: Jean-Michel Patrick Maurice Franchet, Paris (FR); Gilles Charles Casimir Klein, Mery sur Oise (FR)

(73) Assignee: SNECMA, Paris (FR)

( * ) Notice: Subject to any disclaimer, the term of this patent is extended or adjusted under 35 U.S.C. 154(b) by 82 days.

(21) Appl. No.: 13/635,502

(22) PCT Filed: Mar. 18, 2011

(86) PCT No.: PCT/FR2011/050554  
§ 371 (c)(1),  
(2), (4) Date: Sep. 17, 2012

(87) PCT Pub. No.: WO2011/114073  
PCT Pub. Date: Sep. 22, 2011

(65) Prior Publication Data  
US 2013/0008027 A1    Jan. 10, 2013

(30) Foreign Application Priority Data

Mar. 19, 2010 (FR) ...................................... 10 51992

(51) Int. Cl.  
*B21K 3/04* (2006.01)  
*B23P 15/04* (2006.01)

(52) U.S. Cl.  
USPC ..................... 29/889.71; 29/889.7; 416/229 R

(58) Field of Classification Search  
CPC ...... B21D 53/78; B21D 26/055; B23K 20/18; B23K 20/021; B23P 15/04; F01D 5/14; F01D 5/147; F01D 5/282  
USPC ............... 29/889.7, 889.71, 889.72; 416/224, 416/229 R  
See application file for complete search history.

(56) References Cited

U.S. PATENT DOCUMENTS 2,615,236 A * 10/1952 Stulen et al. ............... 29/889.72  
2,799,919 A    7/1957 Wilder, Jr.  
(Continued)

FOREIGN PATENT DOCUMENTS

EP    0 192 105    8/1986  
EP    0 245 548    11/1987  
(Continued)

OTHER PUBLICATIONS

U.S. Appl. No. 13/980,412, filed Jul. 18, 2013, Klein, et al.

(Continued)

*Primary Examiner* — Alexander P Taousakis  
(74) *Attorney, Agent, or Firm* — Oblon, Spivak, McClelland, Maier & Neustadt, L.L.P.

(57) ABSTRACT

A method for producing a metal insert for protecting a leading or trailing edge of a compressor vane of an aeronautical machine made of a composite material, by stamping sheets and diffusion bonding between the sheets. The method includes: initially shaping the sheets by stamping to approximate the sheets to a shape of a suction side and pressure side of the insert; producing a core shaped inner cavity of the metal insert to be manufactured, one of the surfaces thereof reproducing an inner shape of the suction side of the insert and the other surface reproducing an inner shape of the pressure side of the insert; positioning the sheets around the core and securing the assembly; applying a vacuum and sealing the assembly by bonding; assembling the assembly by hot isostatic compression; cutting the assembly to extract the core and separate the insert; producing an outer profile of the insert by a final machining.

9 Claims, 2 Drawing Sheets

(56) References Cited

U.S. PATENT DOCUMENTS

| | | | |
|---|---|---|---|
| 3,936,920 A * | 2/1976 | Conn, Jr. | 29/889.72 |
| 3,981,344 A * | 9/1976 | Hayes et al. | 164/516 |
| 4,010,530 A | 3/1977 | Delgrosso et al. | |
| 4,642,863 A | 2/1987 | Schulz | |
| 4,706,361 A | 11/1987 | Meyer et al. | |
| 5,099,573 A | 3/1992 | Krauss et al. | |
| 5,210,946 A * | 5/1993 | Monroe | 29/889.71 |
| 7,156,622 B2 * | 1/2007 | Schreiber | 416/224 |
| 7,984,547 B2 * | 7/2011 | Steinhardt | 29/889.1 |
| 2005/0278950 A1 | 12/2005 | Despreaux et al. | |
| 2011/0274551 A1 * | 11/2011 | Iwasaki | 416/224 |
| 2011/0274555 A1 * | 11/2011 | Iwasaki | 416/241 R |
| 2012/0233859 A1 * | 9/2012 | Cattiez et al. | 29/889.7 |
| 2012/0317810 A1 * | 12/2012 | Klein et al. | 29/889.71 |
| 2013/0089428 A1 * | 4/2013 | Hottier et al. | 416/223 R |
| 2013/0219717 A1 * | 8/2013 | Dambrine et al. | 29/889.7 |
| 2013/0259701 A1 * | 10/2013 | Dambrine et al. | 416/229 R |
| 2013/0283586 A1 * | 10/2013 | Franchet et al. | 29/423 |
| 2013/0294920 A1 * | 11/2013 | Klein et al. | 416/229 A |
| 2013/0333214 A1 * | 12/2013 | Godon et al. | 29/889.7 |

FOREIGN PATENT DOCUMENTS

| | | |
|---|---|---|
| EP | 0 468 221 | 1/1992 |
| EP | 1 574 270 | 9/2005 |
| FR | 2 319 008 | 2/1977 |

OTHER PUBLICATIONS

International Search Report Issued Jul. 1, 2011 in PCT/FR11/50554 Filed Mar. 18, 2011.

* cited by examiner

METHOD FOR PRODUCING A METAL INSERT TO PROTECT A LEADING EDGE MADE OF A COMPOSITE MATERIAL

The field of the present invention is that of the manufacture of metal parts and more particularly that of the manufacture of titanium leading edges or titanium trailing edges for aerospace applications such as, for example, the leading edges of the wide-chord fan blades used in turbofans, which blades are made of composites.

Turbojet fan blades are currently, for reasons of weight and cost, mainly made of composites. These parts, which are subjected to substantial mechanical stresses due to their rotation speed and the aerodynamic load that they support, must furthermore withstand the impact of foreign particles or bodies that are liable to penetrate into the air stream. Thus, these parts are protected, on their leading and/or trailing edge, by a metal part that covers their ends and that is bonded to the composite of the blade.

The range of processes currently available for manufacturing titanium leading edges for composite fan blades are difficult and complicated to implement, and therefore expensive. This is because these processes are mainly based on hot-forming operations that require tooling that can withstand the temperatures used. Furthermore, these processes necessarily involve substantial machining both for intermediate parts and in the final stages of production.

For reasons of weight and strength, these leading or trailing edges are generally made of titanium and are relatively thin. On account of this small thickness, it has naturally been proposed to use a manufacturing process comprising the joining of sheets by super plastic forming and diffusion bonding (SPFDB). Such a process is described in patent application EP 1 574 270, of the Applicant.

However, this process has the drawback of not allowing the internal shape of the cavity to be easily controlled, and in particular it makes it difficult to optimize the connection between the sheets at the end of the cavity. Specifically, it is important, if the leading edge is to be strong, to produce a joint, between the two sheets, that has a common tangent transverse to the longitudinal axis of the cavity and, if possible, that has a large radius of curvature—the SPFDB process does not enable these things.

The aim of the present invention is to overcome these drawbacks by providing a process for manufacturing titanium leading or trailing edges, which process makes it easier to produce the leading and/or trailing edge cavity, and the manufacturing costs of which are not high.

For this purpose, the subject of the invention is a process for producing a metal insert, for protecting a leading or trailing edge of a composite compressor blade of an aerospace machine, by die forging sheets and diffusion welding them together, characterized in that it comprises steps of:
  initially forming the sheets by die forging so that they resemble the shape of the suction side and the pressure side of said insert;
  producing a core taking the form of the internal cavity of the metal insert to be produced, one of its sides reproducing the internal shape of the suction side of the insert and the other side reproducing the internal shape of the pressure side of the insert, the two sides meeting at a tip reproducing the internal shape of the leading or trailing edge;
  positioning said sheets around said core, the two sheets meeting at the tip of the core to lie parallel, and securely fastening the assembly;
  placing the assembly under vacuum and welding the assembly shut;
  joining the assembly by hot isostatic pressing;
  cutting the assembly so as to extract the core and separate the insert; and
  producing the external profile of the insert using a final machining operation.

Using hot isostatic pressing in association with a core makes it possible to obtain a metal insert the internal cavity of which has a continuous curvature, and thus to prevent stress concentrations at the tip of the cavity.

Preferably, half of each side of the core has the shape to be given to the suction side of the sheets, and the other half has the shape to be given to the pressure side of the sheets, so as to produce two inserts with each operation.

Thus, the rate at which leading and/or trailing edge inserts are produced is doubled and the productivity of the work station is improved.

Advantageously, the core has a longitudinal midpoint indentation on each of the sides, so as to produce, after the hot isostatic pressing, visible scribe lines separating the two inserts.

With this externally visible indentation, the operator knows where to cut the assembly so as to separate the two leading edges produced.

In one embodiment, the initial die forging of the sheets creates a housing at the tip of the leading or trailing edge.

This housing is used to insert a reinforcement that will diffuse into the insert material during the hot isostatic pressing, so as to increase the strength thereof.

Advantageously, in this embodiment, a reinforcement made of composite fibers is placed in the housing when the sheets are positioned around said core.

Preferably, the core is made of a refractory material.

In another embodiment, the core is made of a metal the expansion coefficient of which is different from that of the sheets.

In this embodiment, the core is advantageously covered with an antidiffusion barrier that will not contaminate the metal of the sheets.

Preferably, the metal of the core is a titanium or nickel alloy and the barrier is yttrium oxide.

The invention will be better understood, and other of its aims, details, features and advantages will become more clearly apparent from the following detailed explanatory description of one embodiment of the invention given by way of purely illustrative and nonlimiting example, with reference to the appended schematic drawings.

Figure 1:
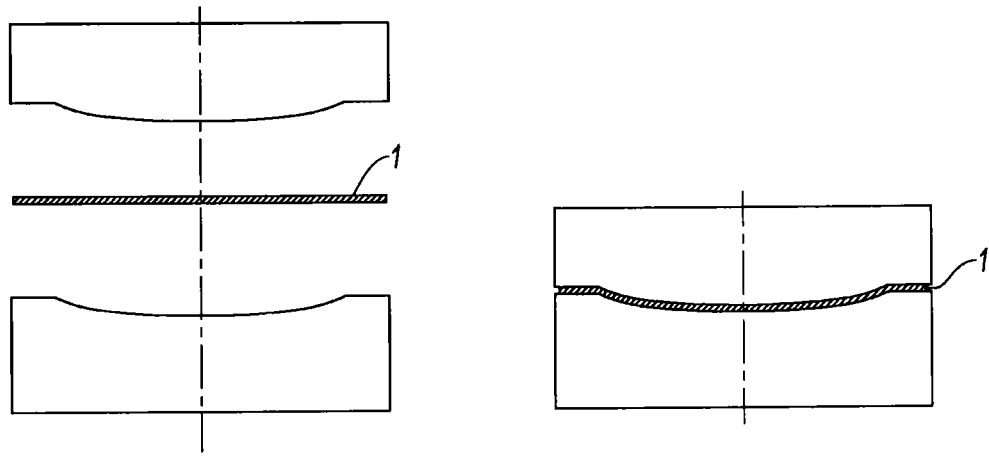
FIG. 1 is a schematic view of a sheet-forming step in a process, according to one embodiment of the invention, for producing a leading edge.

FIG. 1 shows, in two steps, an operation for hot-forming a titanium sheet 1 in order to give it an internal shape that approximately corresponds to the external shape of a refractory core, said core having the precise shape to be given to the internal cavity of the leading edge. Two sheets are thus formed in succession, one of which will form the suction side 1E of the leading edge and the other of which will form its pressure side 1I.

Figure 2:
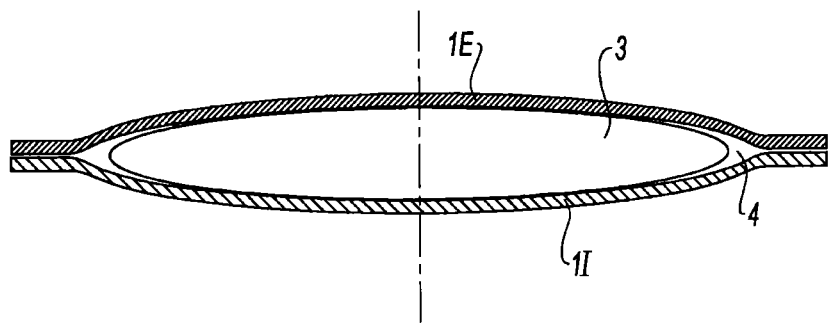
FIG. 2 is a schematic view of a sheet-prejoining step in a process, according to one embodiment of the invention, for producing a leading edge.

FIG. 2 shows a core 3, made of a refractory material (or a metal alloy, such as IN100, with an expansion coefficient that is very different to that of the titanium of the leading edge), encircled by two sheets 1E and 1I preformed as indicated above so as to match the shape of the core over most of their length. It will be observed that the two sheets are not so shaped that, post joining, they meet at the tip of the leading edge and face each other at an angle of 180°, but that they end in portions that lie substantially parallel and that are substantially aligned with the midplane of the core. Therefore, the two sheets do not exactly enclose the core on which they will be joined at the tip of the leading edge. A residual space 4 remains, which space will be removed in subsequent steps.

In this configuration, the sheets are tack welded (not shown in the figure) by TIG welding (arc welding using a nonconsumable tungsten electrode under an inert atmosphere) in order to join the sheets together and keep them in place on the core 3.

Figure 3:
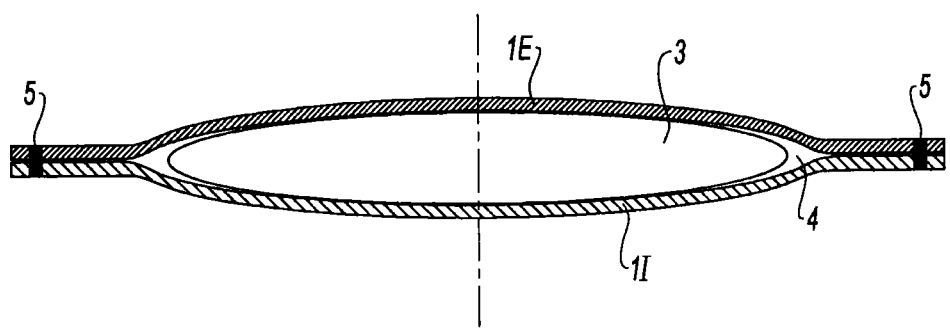
FIG. 3 is a schematic view of a sheet-joining step in a process, according to one embodiment of the invention, for producing a leading edge.

FIG. 3 shows the result of a step of joining the two sheets, 1E and 1I, around the refractory core by means of an electron beam (EB) welding operation. The latter is carried out along a bead 5, parallel to the lateral edges of the sheets, as indicated in FIG. 3, but also at the transverse ends (not shown) of the part.

Figure 4:
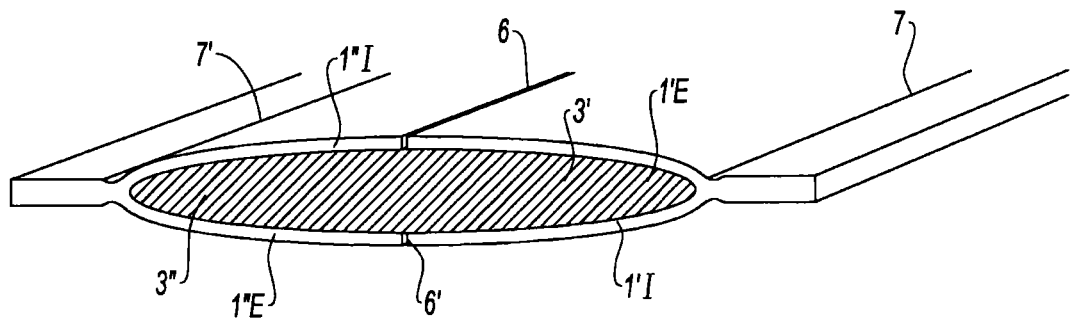
FIG. 4 is a schematic view of a sheet-cutting step in a process, according to one embodiment of the invention, for producing a leading edge.

FIG. 4 shows the leading edge produced after the sheets have been joined using a hot isostatic pressing (HIP) process. The HIP process deforms the sheets 1 plating them against the core 3, the shape of which core the sheets follow perfectly. After this step, the residual spaces 4 have been removed.

FIG. 4 also shows how some of the steps following the HIP pressing operation are carried out. Firstly it will be noted that each sheet 1 is preformed so that half of it resembles the suction side 1E of the leading edge and the other half resembles the pressure side 1I. Likewise, the core 3 is shaped so as to have a longitudinal axis of symmetry, one half 3' of the core having the internal shape of the leading edge, and the other half 3" replicating this shape, though this time on the other side of the core. The two internal shapes face each other across the transverse midplane of the core 3, thereby making it possible to produce two leading edges at the same time.

Thus, the right-hand portion of the figure shows a first leading edge produced by associating the suction-side half-sheet 1'E positioned on the top side of the core with the pressure-side half-sheet 1'I positioned on the bottom side, whereas the left-hand side shows a second leading edge produced using the pressure-side half-sheet 1"I and the suction-side half-sheet 1"E.

FIG. 4 also shows two scribe lines 6 and 6' that extend along the transverse midplane of the assembly formed by the sheets 1 and the core 3. These lines enable the two leading edges to be separated from each other after the HIP pressing operation has been carried out. Finally, FIG. 4 shows two contour lines 7 and 7' along which excess material is removed from the lateral sides of the two leading edges.

Figure 5:
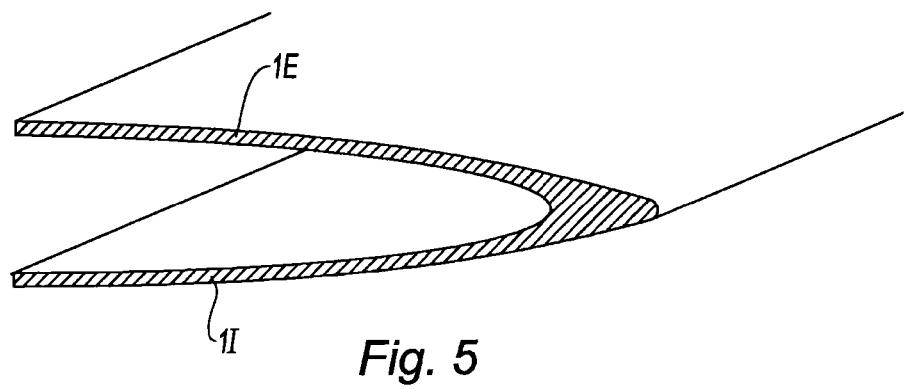
FIG. 5 is a schematic view of a leading edge produced using a process according to one embodiment of the invention.

FIG. 5 shows a leading edge at the end of the production process, after it has been separated from its twin part and its profile has been finished using appropriate machining operations.

Figure 6:
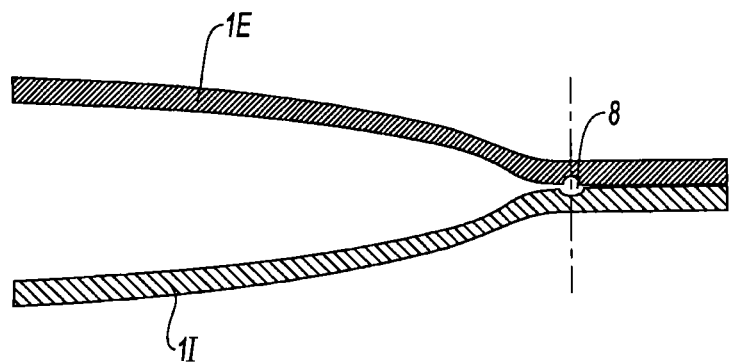
FIG. 6 is a view of the front portion of a leading edge during the sheet-forming step of a variant process according to the invention.

FIG. 6 shows a variant of the process according to the invention in which, during the forming step, a housing 8 is provided between the two sheets at the end of the residual space 4 on each side of the core 3. The housing is positioned so as to be located at the tip of the leading edge after the HIP pressing operation. This housing has, such as shown but not necessarily, a tubular shape, so that a cylindrical reinforcement made of composite fibers may be inserted therein.

The way in which two leading edges are manufactured simultaneously using a process according to one embodiment of the invention will now be described.

The process starts with a conventional die forging operation that produces sheets with a shape similar to that desired for the leading edge. Whereas in the prior art the forming operation had to be precise in order to provide a part of almost exactly the right size, here the forming operation is used only as a means for providing approximately the right shape, so as to simplify the subsequent hot-forming step. In addition, in the prior art, die forging could lead to waves appearing on the surface of the sheet after forming, especially if it were desired to produce a part with a high degree of twisting. This effect no longer occurs with the invention, the strain on forming being less severe.

The shape of the die is such that it gives the shape of the suction side to half the sheet and the shape of the pressure side to its other half. Two sheets are thus formed, one intended to be placed on the upper portion of the core and a second intended to be placed on its lower portion, opposite the first.

The two sheets are joined around the core by TIG tack welding along the lateral edges of the sheets. The assembly is then placed in a vacuum chamber so as to carry out an electron beam welding operation. A continuous welding bead 5 is produced both along the lateral edges of the sheets and along their transverse edges, thereby allowing the core 3 to be completely encircled and the assembly to be closed. A vacuum is thus created between the sheets 1 and the core 3, and in particular in the residual spaces 4 remaining between the sheets 1E, 1I and the tips of the core 3. It should be noted that the vacuum pumping step, which is required for the electron beam welding operation, is also required to carry out the following step of the process according to the invention. Combining the vacuum pumping steps of these two operations simplifies the process and thus helps to reduce the production cost of the leading edge.

The assembly formed by the core 3 and the two sheets 1E and 1I is then subjected to a hot isostatic pressing operation, carried out at a temperature of about 940° C., in the case considered of a vane made of TA6V titanium alloy. At this temperature the metal becomes relatively soft and can flow under the action of the pressure, about 1000 bar, which is applied to it. The two sheets deform so as to perfectly follow the shape of the core 3 and remove the residual spaces 4. In particular, the two sheets meet at the tip of the core at an angle of 180°. In parallel, under the effect of the heating, the two sheets are welded to each other by diffusion. Combining these two effects produces a leading-edge internal cavity that has exactly the same shape as the core and that has, at its tip, the desired radius of curvature. Due to the temperature used, the radius of curvature is produced without stress appearing at the tip, as was the case in the prior art.

The following operations consist in disassembling the two leading edges produced by carrying out two cuts 6 and 6' along the transverse midplane of the assembly enclosing the core 3. To make this operation easier the core preferably has, along the scribe lines, a longitudinal indentation, not shown in the figures, that marks the location of the scribe lines. During the HIP pressing operation the metal of the sheets flows and fills the indentation in the core 3 recreating an indentation in the external side of the sheets, which indentation will be visible from the exterior. The operator will thus know where to make the two cuts 6 and 6'.

Moreover, the core is made of a material chosen so that there is no adhesion between the sheets and it. This material is generally a refractory material, into which titanium does not diffuse, or a metal with a different expansion coefficient to that of the sheets. These differences in expansion prevent, in this case, the sheets 1 from bonding to the core 3 during the HIP pressing operation. In a particular embodiment, the metal core is moreover covered with an antidiffusion barrier that does not contaminate titanium, such as yttrium oxide, there thereby being no risk of bonding during the HIP pressing operation.

Whatever type of core is employed, the invention enables it to be reused, since it is neither degraded nor consumed during the implementation of the process according to the invention. This therefore allows the production cost of the leading edge to be reduced, independently of the quality of the internal cavity produced.

The end of the process comprises a step of removing excess material from along the lateral edges of the two leading edges, by cutting along the contour lines 7 and 7'. A final machining operation allows the desired external shape to be given to the leading edge.

In the variant illustrated in FIG. 6, the die for preforming the sheets is shaped so as to generate a housing 8 at the end of the residual space 4. A reinforcement made of composite fibers is placed in this housing when the sheets 1 are installed on the core 3, before the TIG tack welding operation. The fiber trapped in this housing diffuses into the metal of the sheets during the HIP pressing operation and creates a fibrous reinforcement at the tip of the leading edge. Thus, the ability of the leading edge to withstand erosion and impacts is increased.

Although the invention was described with regard to a particular embodiment, it is of course obvious that it encompasses every technical equivalent of the means described and their combinations if the latter lie within the scope of the invention.

The invention claimed is:

1. A process for producing a metal insert, for protecting a leading or trailing edge of a composite compressor blade of an aerospace machine, by die forging sheets and diffusion welding the sheets together, the method comprising:
    initially forming the sheets by die forging so the sheets resemble a shape of a suction side and a pressure side of the insert;
    producing a core taking a form of an internal cavity of the metal insert to be produced, a first side reproducing an internal shape of the suction side of the insert and a second side reproducing an internal shape of the pressure side of the insert, the two sides meeting at a tip reproducing an internal shape of the leading or trailing edge;
    positioning the sheets around the core, the sheets meeting at the tip of the core to lie parallel, and securely fastening an assembly of the sheets positioned around the core;
    placing the assembly under vacuum and welding the assembly shut;
    joining the assembly through solid state diffusion;
    cutting the assembly so as to extract the core and separate the insert; and
    producing an external profile of the insert using a final machining operation;
    wherein the two sides of the core meet at a tip reproducing the internal shape of the leading or trailing edge, and
    wherein the two sheets meet at the tip of the core to lie parallel and the solid state diffusion takes place through hot isostatic pressing.

2. The process as claimed in claim 1, in which half of each side of the core has a shape to be given to the suction side of the sheets, and the other half has a shape to be given to the pressure side of the sheets, so as to produce two inserts with each operation.

3. The process as claimed in claim 2, in which the core has a longitudinal midpoint indentation on each of the sides, to produce, after the hot isostatic pressing, visible scribe lines separating the two inserts.

4. The process as claimed in claim 1, in which the initial die forging of the sheets creates a housing at the tip of the leading or trailing edge.

5. The process as claimed in claim 4, in which a reinforcement made of composite fibers is placed in the housing when the sheets are positioned around the core.

6. The process as claimed in claim 1, in which the core is made of a refractory material.

7. The process as claimed in claim 1, in which the core is made of a metal with an expansion coefficient different from that of the sheets.

8. The process as claimed in claim 7, in which the core is covered with an antidiffusion barrier that will not contaminate the metal of the sheets.

9. The process as claimed in claim 8, in which the metal of the core is a titanium or nickel alloy and the barrier is yttrium oxide.

* * * * *